United States Patent [19]
Kunieda et al.

[11] Patent Number: 5,850,332
[45] Date of Patent: Dec. 15, 1998

[54] PROCESS FOR MAKING SOLID ELECTROLYIC CAPACITOR

[75] Inventors: Youichi Kunieda; Shigeki Kibayashi, both of Kyoto, Japan

[73] Assignee: Rohm Co. Ltd., Kyoto, Japan

[21] Appl. No.: 550,231

[22] Filed: Oct. 30, 1995

[30] Foreign Application Priority Data

Oct. 31, 1994 [JP] Japan ..................................... 6-267646
Oct. 11, 1995 [JP] Japan ..................................... 7-263036

[51] Int. Cl.⁶ .............................. H01G 9/00; H01G 4/00; H01G 7/00
[52] U.S. Cl. ....................... 361/523; 361/301.3; 361/303; 361/306.1; 361/307; 361/310; 361/528; 361/532; 29/25.42
[58] Field of Search ..................................... 361/303–305, 361/306.1, 307, 308.1, 308.3, 309–310, 301.3, 532, 523, 528; 29/25.41, 25.42; 219/121.13, 121.14

[56] References Cited

U.S. PATENT DOCUMENTS 3,516,150  6/1970  Leech .
4,185,317  1/1980  LAmbrecht .
4,288,842  9/1981  Voyles .

*Primary Examiner*—Bot Ledynh
*Attorney, Agent, or Firm*—Michael D. Bednarek; Kilpatrick Stockton LLP

[57] ABSTRACT

A process for making a solid electrolytic capacitor is provided which comprises the following steps. First, a capacitor element is prepared which includes a capacitor chip and an anode wire projecting from the capacitor chip. Then, the anode wire of the capacitor element is brought into contact with an anode lead. Finally, the anode wire is bonded to the anode lead at a connecting portion spaced from a tip of the anode wire.

6 Claims, 6 Drawing Sheets

PROCESS FOR MAKING SOLID ELECTROLYIC CAPACITOR

BACKGROUND OF THE INVENTION

1. Field of the Invention

This invention relates to an improved process for making a solid electrolytic capacitor such as tantalum capacitor, niobium capacitor, or aluminum capacitor. The present invention also relates to a solid electrolytic capacitor produced by such a method.

2. Description of the Related Art

Solid electrolytic capacitors such as tantalum capacitor are known to provide a large capacitance while realizing a great size reduction. For this reason, solid electrolytic capacitors are used in various applications.

A tantalum capacitor for example is typically produced in the manner illustrated in FIGS. 12 through 14 of the accompanying drawings.

First, as shown in FIG. 12, a plurality of capacitor elements 101 are attached to a carrier bar 102 at suitable spacing therealong. Each of the capacitor elements 101 includes a capacitor chip 101a and an anode wire 101b projecting from the chip 101a. The capacitor chip 101a may be a compacted and sintered mass of tantalum powder, and the anode wire 101b may be also made of tantalum. The attachment of the capacitor element 101 may be performed by welding the upper end of the anode wire 101b to the carrier bar 102 which may be made of tantalum or stainless steel for example.

Then, each of the capacitor elements 101 thus suspended from the carrier bar 102 is successively subjected to formation of a dielectric layer (tantalum oxide layer), a solid electrolyte layer (manganese dioxide layer) and a cathode metal layer (e.g. silver layer) on the chip 1a. The respective layers formed by these successive steps are conventional and therefore not illustrated.

Then, as also shown in FIG. 12, each of the capacitor elements 101 is successively separated from the carrier bar 102 by cutting the anode wire 101b along a suitable cutting line CL'. The cutting of the anode wire 101b may be performed by using a known press punching machine (not shown).

Then, as shown in FIG. 13, each of the capacitor elements 101 is successively transferred, by a suction collet 103, to an elongate leadframe 104 (only partially illustrated) which includes plural pairs of leads 104a, 104b constantly spaced along the leadframe 102. Specifically, the chip 101a of the capacitor element 101 is brought onto a cathode lead 104a of a corresponding lead pair, whereas the anode wire 101b is brought into direct contact with an anode lead 104b of the corresponding lead pair.

Then, as also shown in FIG. 13, the anode wire 101b of each capacitor element 101 and the corresponding anode lead 104b is vertically clamped between a pair of welding electrodes 105a, 105b at the wire tip, and a current is passed across the welding electrodes 105a, 105b to weld the anode wire 101b to the anode lead 4b at a portion 106.

Then, the connection between the anode wire 101b and the anode lead 104b is checked by a conventional image processing unit (not shown) with respect to the length of the connected portion 106 and the orientation of the anode wire 101b. If the connection is found improper, the particular capacitor element 101 is rejected. Conversely, if the connection is found proper, the next step follows.

Then, as shown in FIG. 14, the capacitor chip 101a is electrically connected to the cathode lead 104a through a bondwire 108 by using a known capillary tool (not shown).

Then, as also shown in FIG. 14, a resin package 107 is molded with respect to each capacitor element 101 which has been found to have a proper connection between the anode wire 101b and the anode lead 104b. The formation of the resin package 107 is performed by using a conventional mold (not shown) in such a manner that the capacitor element 101 is completely enclosed within the package 101, whereas each of the cathode and anode leads 104a, 104b partially projects out of the package 107. The package 107 may be typically made of an epoxy resin.

Finally, as also shown in FIG. 4, the respective leads 104a, 104b for each packaged capacitor element 101 is punched off the leadframe 104 and bent under the package 107 by a conventional punching machine (not shown) to provide a product capacitor.

According to the prior art process described above, the anode wire 101b of the capacitor element 101 is likely to positionally deviate relative to the anode lead 104b at the time of transferring the capacitor element 101 to the leadframe 4. If the length of overlap between the anode wire 101b and the anode lead 104b is insufficient, improper electrical connection between them will result to provide a rejectable product, thereby reducing the production yield.

Further, if the length of overlap between the anode wire 101b and the anode lead 104b is insufficient, the capacitor element 101 may angularly deviate vertically and/or laterally due to poor stability upon sandwiching the anode wire 101b and the anode lead 104b between the pair of welding electrodes 105a, 105b (FIG. 13). As a result, the capacitor element 101 and the bondwire 108 may be improperly located within the resin package 107, as shown in FIGS. 15 and 16, so that the resin package 107 may fail to provide an intended protection at a thin-walled portion. In an extreme case, the capacitor element 101 and/or the bondwire 108 may be partially exposed outside the resin package 107, and the thin dielectric layer of the capacitor element may be damaged by an external force or impact to result in current leakage. Such a problem is particularly serious in view of the fact that a size reduction of capacitors is increasingly demanded wherein even a small inclination of the capacitor element may cause exposure of the capacitor element outside the resin package.

SUMMARY OF THE INVENTION

It is, therefore, an object of the present invention to provide an improved process for making a solid electrolytic capacitor which overcomes the above-described problems.

Another object of the present invention is to provide a solid electrolytic capacitor made by such a method.

According to one aspect of the present invention, there is provided a process for making a solid electrolytic capacitor comprising the steps of:

preparing a capacitor element which includes a capacitor chip and an anode wire projecting from the capacitor chip;

bringing the anode wire of the capacitor element into contact with an anode lead; and bonding the anode wire to the anode lead at a connecting portion spaced from a tip of the anode wire.

Preferably, the bonding of the anode wire may be performed by welding. Specifically, the anode wire and the anode lead are sandwiched between a pair of welding electrodes, and a current is passed across the welding electrodes.

The process may also comprise an additional step of electrically connecting the capacitor chip to a cathode lead.

Further, the process may comprise an additional step of molding a resin package to enclose the capacitor element.

According to a preferred embodiment of the present invention, the process may comprise an additional step of removing a non-bonded tip end portion of the anode wire after bonding the anode wire to the anode lead.

The removal of the tip end portion of the anode wire may be performed by cutting the anode wire at a predetermined distance from the tip of the anode wire. In case the anode lead is formed with a perforation facing the tip of the anode wire, it is particularly advantageous if the cutting of the anode wire is performed to form a cutting burr entering into the perforation of the anode lead.

In case the anode wire is formed with at least one notch located at a predetermined distance from the tip of the anode wire, the removal of the tip end portion of the anode wire may be performed by causing separation at the notch. In this case, the separation of the anode wire may be advantageously performed by pulling a chuck which has a pawl engaging the notch.

According to another aspect of the present invention, there is provided a process for making solid electrolytic capacitors comprising the steps of:

attaching a plurality of capacitor elements to a carrier bar at suitable spacing therealong, each of the capacitor elements including a capacitor chip and an anode wire projecting from the capacitor chip;

bringing the carrier bar together with the attached capacitor elements to a leadframe which has a plurality of anode leads in corresponding relation to the attached capacitor elements;

bonding the anode wire of each capacitor element to a corresponding anode lead at a connecting portion between the carrier bar and the capacitor chip; and removing the carrier bar together with a non-bonded portion of the anode wire.

According to a further aspect of the present invention, there is provided a solid electrolytic capacitor comprising:

a capacitor element including a capacitor chip and an anode wire projecting from the capacitor chip; and an anode lead electrically connected to the anode wire of the capacitor element;

wherein the anode wire has a non-bonded tip end portion and a connecting portion bonded to the anode lead.

The anode lead may be formed with a perforation facing the tip end portion of the anode wire. Further, the tip end portion of the anode wire may preferably have a cutting burr entering into the perforation of the anode lead.

Other objects, features and advantages of the present invention will be fully understood from the following detailed description given with reference to the accompanying drawings.

DETAILED DESCRIPTION OF THE PREFERRED EMBODIMENTS

Figure 1:
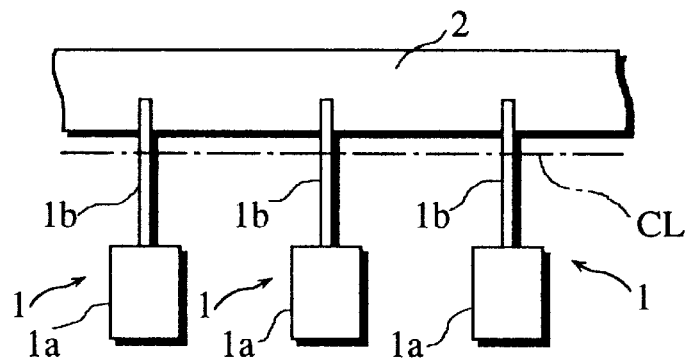
FIGS. 1 through 4 are views showing the successive steps of making a solid electrolytic capacitor according to a first embodiment of the present invention.
Figure 2:
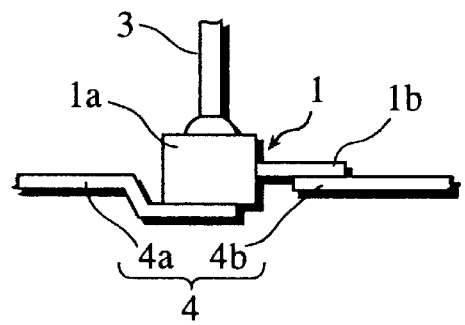
Figure 3:
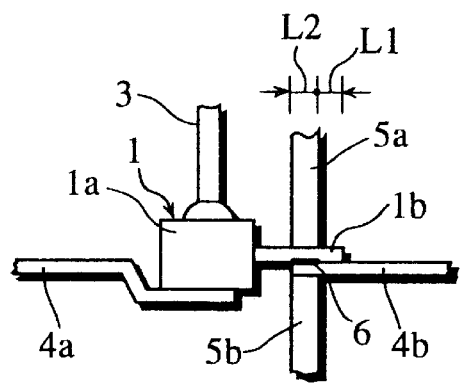

FIGS. 1 through 3 of the accompanying drawings illustrate the successive steps of making solid electrolytic capacitors according to a first embodiment of the present invention. Each of the capacitors may be a tantalum capacitor, aluminum capacitor or a niobium capacitor for example.

First, as shown in FIG. 1, a plurality of capacitor elements 1 are attached to a carrier bar 2 at suitable spacing therealong. Each of the capacitor elements 1 includes a capacitor chip 1a and an anode wire 1b projecting from the chip 1a. The capacitor chip 1a may be a compacted and sintered mass of valve metal powder (e.g. tantalum powder), and the anode wire 1b is made of a metal (e.g. tantalum). The attachment of the capacitor element 1 may be performed by welding the upper end of the anode wire 1b to the carrier bar 2 which may be made of tantalum or stainless steel for example.

Then, each of the capacitor elements 1 thus suspended from the carrier bar 2 is successively subjected to formation of a dielectric layer (e.g. tantalum oxide layer), a solid electrolyte layer (e.g. manganese dioxide layer) and a cathode metal layer (e.g. silver layer) on the chip 1a. These successive steps are conventional and therefore requires no description.

Then, as also shown in FIG. 1, each of the capacitor elements 1 is successively separated from the carrier bar 2 by cutting the anode wire 1b along a suitable cutting line CL. The cutting of the anode wire 1b may be performed by using a conventional press punching machine (not shown).

Then, as shown in FIG. 2, each of the capacitor elements 1 is successively transferred to an elongate leadframe 4 (only partially illustrated) which includes plural pairs of leads 4a, 4b constantly spaced along the leadframe 2. Specifically, the chip 1a of the capacitor element 1 is brought onto a cathode lead 4a of a corresponding lead pair, whereas the anode wire 1b is brought into direct contact with an anode lead 4b of the corresponding lead pair. The transfer of the capacitor element 1 may be performed by a suction collet 3 which comes into sucking contact with the capacitor chip 1a. Though not shown, an intervening solder paste layer exists between the chip 1a and the cathode lead 4a.

Then, as shown in FIG. 3, the anode wire 1b of each capacitor element 1 and the corresponding anode lead 4b is vertically clamped between a pair of welding electrodes 5a, 5b at a suitable distance L1 spaced from the wire tip, and a current is passed across the welding electrodes 5a, 5b to weld the anode wire 1b to the anode lead 4b at a portion 6. The distance L1 may be 2–3 mm for example, but this distance is optionally selected depending on various requirements.

Then, the connection between the anode wire 1b and the anode lead 4b is checked by a conventional image processing unit (not shown) with respect to the length L2 of the connected portion 6 and the orientation of the anode wire 1b. If the connection is found improper, the particular capacitor element 1 is rejected. Conversely, if the connection is found proper, the next step follows.

Figure 4:
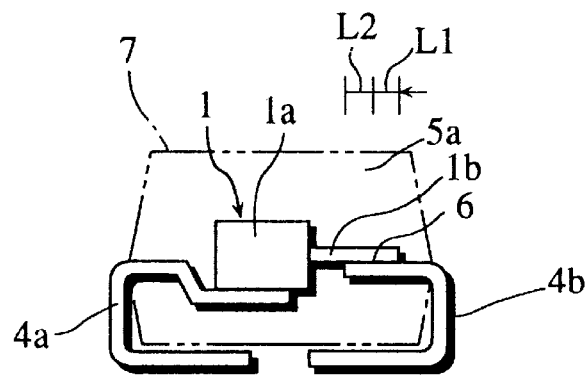

Then, as shown in FIG. 4, a resin package 7 is molded with respect to each capacitor element 1 which has been found to have a proper connection between the anode wire 1b and the anode lead 4b. The formation of the resin package 7 is performed by using a conventional mold (not shown) in such a manner that the capacitor element 1 is completely enclosed within the package 1, whereas each of the cathode and anode leads 4a, 4b partially projects out of the package 7. The package 7 may be typically made of an epoxy resin.

Finally, as also shown in FIG. 4, the respective leads 4a, 4b for each packaged capacitor element 1 is punched off the leadframe 4 and bent under the package 7 by a conventional punching machine (not shown) to provide a product capacitor.

It should be appreciated that the various process steps shown in FIGS. 2 through 4 may be performed in different process stations, and the transfer of the leadframe 4 between the different process stations may be performed by a belt conveyor or by an indexing conveyor having engaging pins.

According to the process described above, since the welding electrodes 5a, 5b (see FIG. 3) are made to clamp the anode wire 1b and the anode lead 4b at a position suitably spaced from the tip of the anode wire 1b. Thus, the length L2 of the connected or welded portion 6 can be always constant even if the anode wire 1b longitudinally deviates relative to the anode lead 4b.

Figure 15:
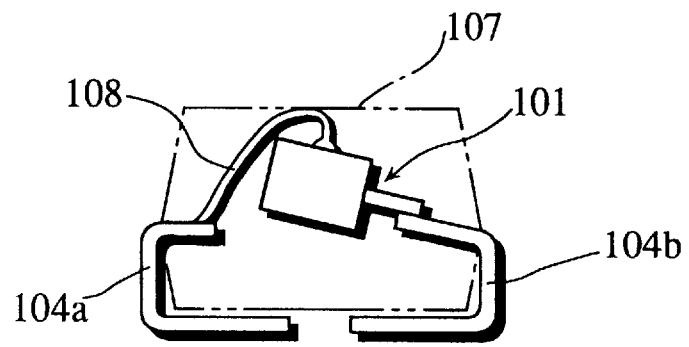
FIG. 15 is a front view illustrating a possible disadvantage encountered in the prior art capacitor.
Figure 16:
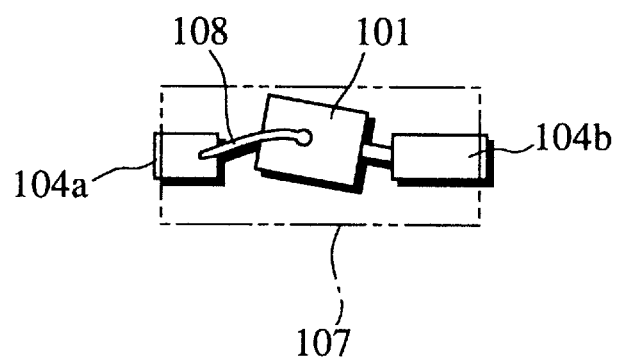
FIG. 16 is a plan view illustrating another possible disadvantage encountered in the prior art capacitor.

Further, since the non-connected tip end of the anode wire 1b is brought into direct contact with the anode lead 4b, it is possible to prevent or regulate the capacitor element 1 from angularly deviating either in a horizontal or vertical plane at the time of welding the anode wire, as opposed to the prior art capacitor shown in FIGS. 15 and 16. As a result, the resin package 7 can be made to have a sufficient wall thickness entirely around the capacitor element 1, so that the capacitor element is unlikely to be subjected directly to an external impact or force which would otherwise cause damage to the thin dielectric layer and thereby lead to a current leakage.

Figure 5:
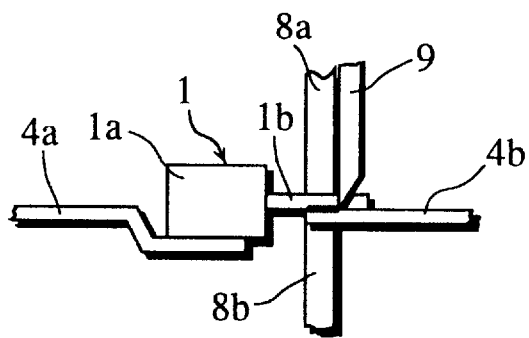
FIG. 5 is a front view showing a step of cutting an anode wire for making a solid electrolytic capacitor according to a second embodiment of the present invention.

FIG. 5 shows a second embodiment which incorporates an additional step subsequent to the step of welding the anode wire 1b to the anode lead 4b (FIG. 3). Specifically, after the anode wire welding step, the anode wire 1b and the corresponding anode lead 4b is vertically clamped between a pair of strippers 8a, 8b which is made of a hard metal, and a cutting blade 9 also made of a hard metal is lowered along the upper stripper 8a to cut the non-welded tip end of the anode wire 1b off the remaining portion. The non-welded tip end of the anode wire 1b thus cut off may be removed manually or automatically from the anode lead 4b.

Figure 6:
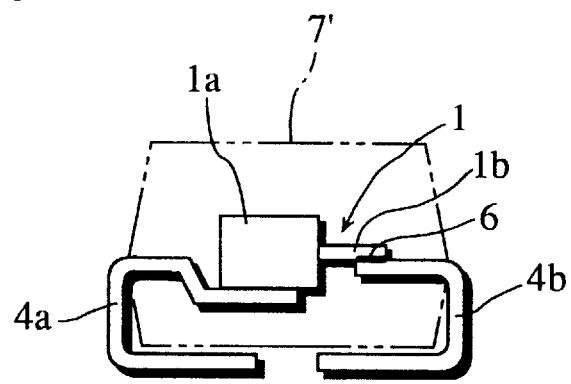
FIG. 6 is a front view showing the capacitor of the second embodiment embodiment.
Figure 7:
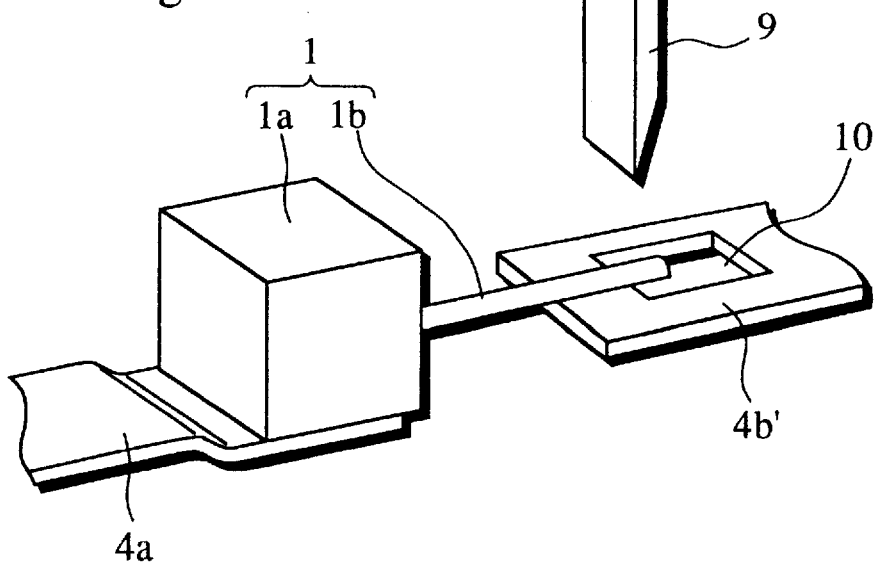
FIG. 7 is a perspective view showing a step of cutting an anode wire for making a solid electrolytic capacitor according to a third embodiment of the present invention.

According to the second embodiment described above, due to the removal of the non-welded tip end of the anode wire 1b, a subsequently molded resin package 7' may be rendered smaller in size than is possible in the first embodiment (see FIG. 4), as shown in FIG. 6. Nevertheless, since the non-welded tip end of the anode wire 1b is present in the step of welding the anode wire 1b to the anode lead 4b (see FIG. 3), all of the advantages described above in relation to the first embodiment are also obtainable in the second embodiment.

Figure 8:
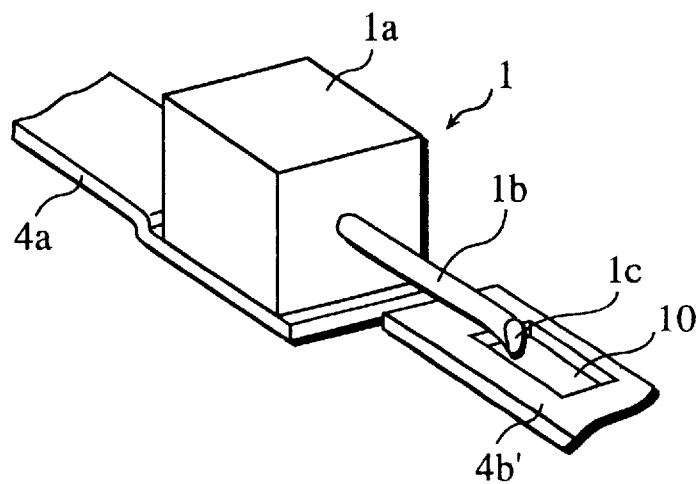
FIG. 8 is a perspective view showing the configuration of the anode wire after cutting according to the step shown in FIG. 7.
Figure 9:
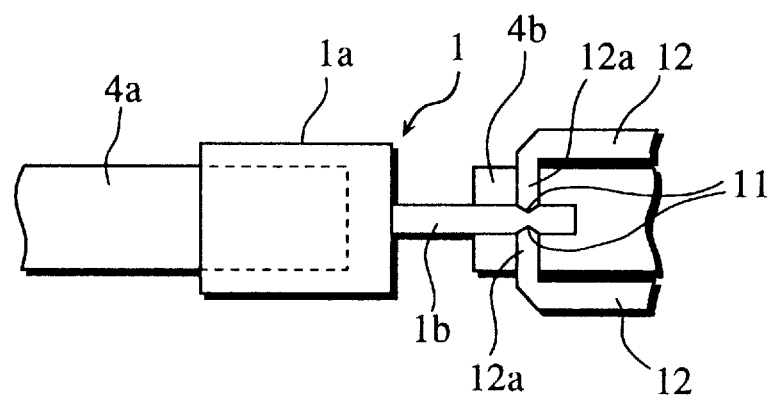
FIG. 9 is a plan view showing a modified step of cutting an anode wire.

FIGS. 8 and 9 show a third embodiment wherein the anode wire 1b is welded to a modified anode lead 4b' which has a perforation 10 facing the non-welded tip end of the anode wire 1b. After welding the anode wire 1b to the anode lead 4b' in this embodiment, the cutting blade 9 may be lowered into the perforation 10 of the anode lead 4b' to cut the non-welded tip end of the anode wire 1b off the remaining portion. As a result, a cutting burr 1c is formed at a new tip end of the anode wire 1b to project into the perforation 10, as shown in FIG. 8.

The third embodiment described above is advantageous for the following reasons.

First, the perforation 10 of the anode lead 4b' allows full lowering of the cutting blade 9. Thus, the non-welded tip end of the anode wire 1b can be reliably cut off the remaining portion without damaging or cutting the anode lead 4b'. Of course, the movement control of the cutting blade 9 can also be greatly facilitated.

Secondly, the cutting burr 1c of the anode wire 1b comes into engagement with the perforation 10 of the anode lead 4b' if a pulling force is applied to the anode lead 4b'. Thus, unexpected removal of the anode lead 4b' is reliably prevented by the presence of the cutting burr 1c. Preferably, the cutting burr 1c of the anode wire 1b should be located as close to a peripheral wall of the perforation 10 which is closest to the cathode lead 4a.

FIG. 9 shows a modified step of cutting the non-welded tip end of the anode wire 1b. Specifically, the anode wire 1b is preliminarily formed with an opposite pair of notches 11 at a predetermined distance from the tip end, and a chuck 12 having an opposite pair of pawls 12a in engagement with the notches 11 is pulled away from the chip 1a. According to this modified cutting step, the non-welded tip end of the anode wire 1b can be reliably cut off without damaging the anode lead 4b. The opening and closing of the chuck 12 may be performed by a conventional cylinder device for example.

It should be appreciated that a notch (or notches) of the anode wire 1b can be also utilized for facilitating the cutting step which uses the cutting blade 9 (see FIG. 5). More specifically, the cutting blade 9 is lowered to cut the non-welded tip end of the anode wire 1b at the notch. In this case, the notch allows complete separation of the non-welded tip end of the anode wire 1b with a decreased force even before the cutting blade 9 advances to the anode lead 4b, so that the anode lead 4b can be prevented from coming into damaging contact with the cutting blade 9 and/or from bending under a large cutting force. Further, the presence of the notch even permits cutting of the non-welded tip end of the anode wire 1b by bending at the notch.

A notch (or notches notch) of the anode wire 1b may be made by various methods. For instance, while each capacitor element 1 is suspended from the carrier bar 2 (see FIG. 1), an opposite pair of notches may be formed by clamping the anode wire between an opposite pair of sharply edged blade members (not shown).

The depth of the notch may be optionally selected as long as the anode wire 1b retains a sufficient strength at the notch for enduring the subsequent step of welding the anode wire 1b to the anode lead 4b. Further, the shape of the notch is also optional though a V-shaped notch is preferred.

Figure 10:
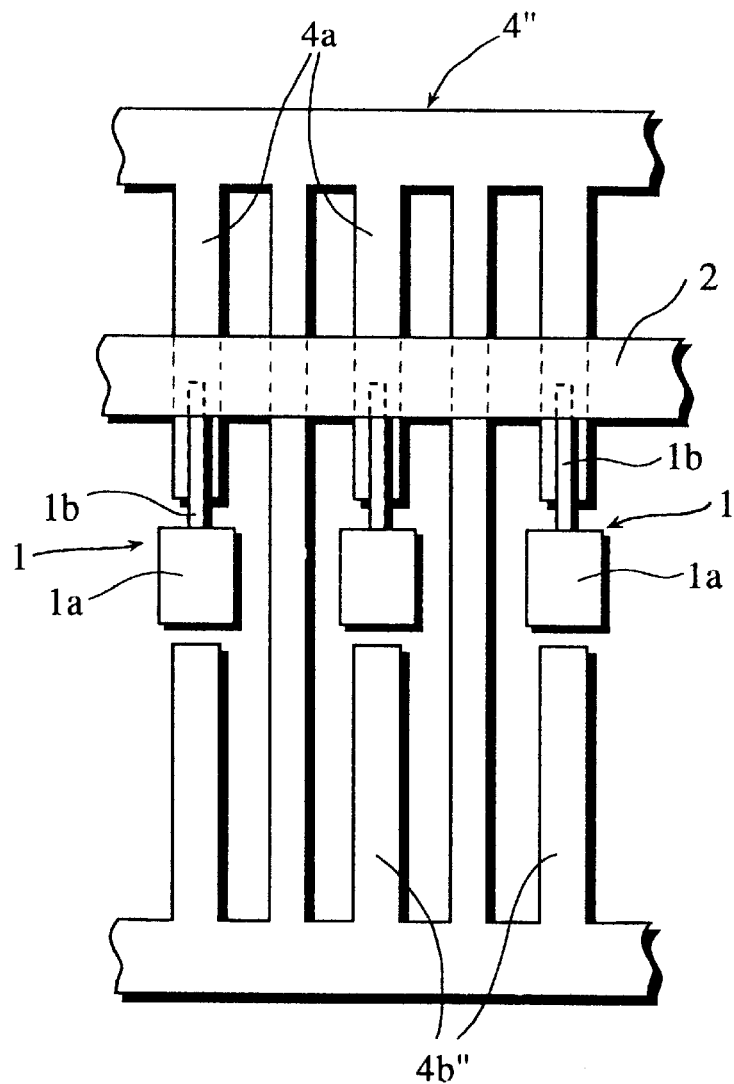
FIG. 10 is a plan view showing a wire attaching step used for making a solid electrolytic capacitor according to a fourth embodiment of the present invention.

FIG. 10 shows another embodiment wherein the steps of welding the anode wire 1b and cutting the non-welded tip end of the anode wire 1b is performed collectively with respect to a plurality of capacitor elements 1 while they are held attached to the carrier bar 2. For this purpose, use is made of a leadframe 4" which has plural pairs of leads 4a, 4b" at the same pitch as the plural capacitor elements 1 attached to the carrier bar 2. The welding and tip-cutting steps for each capacitor element may be performed substantially in the same manner as already described (see FIGS. 3, 5, 7 and 9), but the production efficiency can be greatly increased due to collective treatment of the plural capacitor elements.

Figure 11:
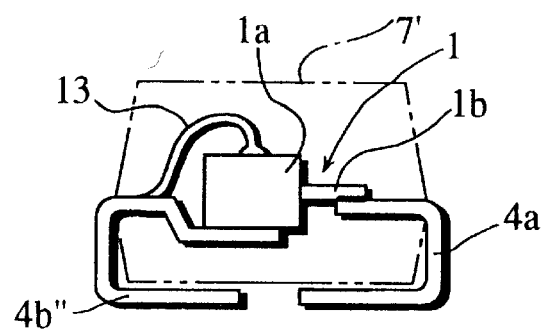
FIG. 11 is a front view showing the capacitor of the fourth embodiment.
Figure 12:
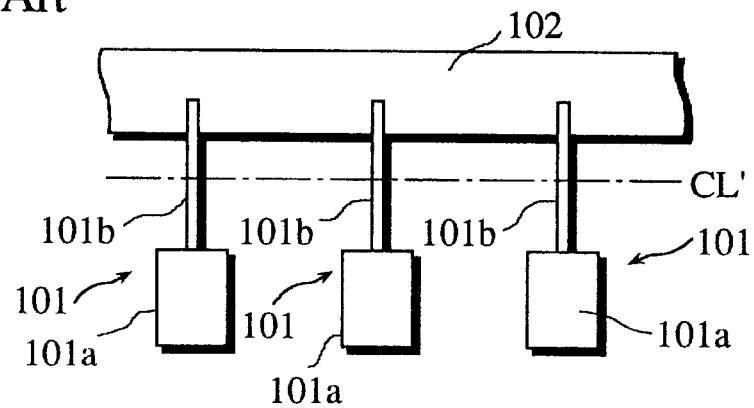
FIGS. 12 through 14 are views showing the successive steps of making a prior art solid electrolytic capacitor.
Figure 13:
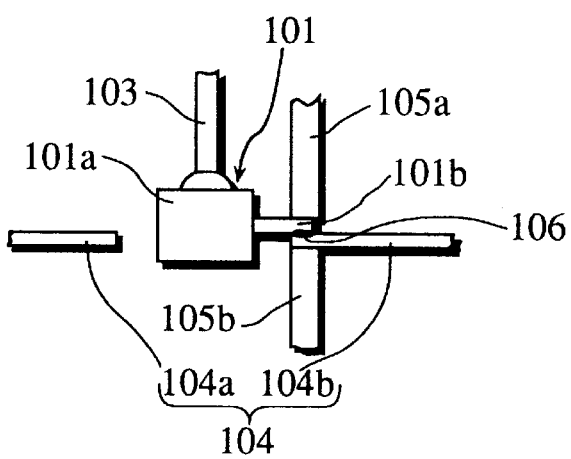
Figure 14:
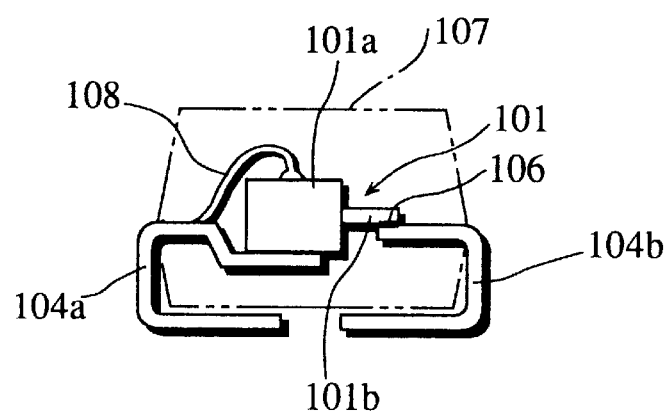

According to the embodiment shown in FIG. 10, each of the cathode leads 4b" is shown to extend short of a corresponding capacitor chip 1a. Thus, it is necessary to establish electrical connection between the cathode lead 4b" and the capacitor chip 1a by a bondwire 13, as shown in FIG. 11. Of course, such wirebonding is also applicable to any of the foregoing embodiments.

Further, according to the embodiment shown in FIG. 10, the carrier bar 2 is positioned within the width of the leadframe 4" at the time of bonding the anode wire 1b of each capacitor element 1. However, if the anode wire 1b is sufficiently elongated, the carrier bar 2 may be located outside the width of the leadframe 4" at the time of bonding the anode wire 1b.

The preferred embodiment of the present invention being thus described, it is obvious that the same may be varied in many ways. For instance, the anode wire 1b may be welded to the anode lead 4b (or 4b') from below. Alternatively, the anode wire 1b may be first welded to the anode lead 4b (or 4b') from above, and the capacitor element 1 together with the anode lead is turned over before molding the resin package 7 (or 7'). Such variations are not to be regarded as a departure from the spirit and scope of the present invention, and all such modifications as would be obvious to those skilled in the art are intended to be included within the scope of the following claims.

We claim:

1. A process for making a solid electrolytic capacitor comprising the steps of:

preparing a capacitor element which includes a capacitor chip and an anode wire projecting from the capacitor chip;

bringing the anode wire of the capacitor element into contact with an anode lead;

bonding the anode wire to the anode lead at a connecting portion spaced from a tip of the anode wire; and removing a non-bonded tip end portion of the anode wire.

2. The process according to claim 1, wherein the removal of the tip end portion of the anode wire is performed by cutting the anode wire at a predetermined distance from the tip of the anode wire.

3. The process according to claim 2, wherein the anode lead is formed with a perforation facing the tip of the anode wire, the cutting of the anode wire is performed to form a cutting burr entering into the perforation of the anode lead.

4. The process according to claim 1, wherein the anode wire is formed with at least one notch located at a predetermined distance from the tip of the anode wire, the removal of the tip end portion of the anode wire is performed by causing separation at the notch.

5. The process according to claim 4, the separation of the anode wire is performed by pulling a chuck which has a pawl engaging the notch.

6. A process for making solid electrolytic capacitors comprising the steps of:

attaching a plurality of capacitor elements to a carrier bar at suitable spacing therealong, each of the capacitor elements including a capacitor chip and an anode wire projecting from the capacitor chip;

bringing the carrier bar together with the attached capacitor elements to a leadframe which has a plurality of anode leads in corresponding relation to the attached capacitor elements;

bonding the anode wire of each capacitor element to a corresponding anode lead at a connecting portion between the carrier bar and the capacitor chip; and removing the carrier bar together with a non-bonded portion of the anode wire.

* * * * *